United States Patent [19]

Mabuchi

[11] 4,431,933

[45] Feb. 14, 1984

[54] BRUSH HOLDING DEVICE

[76] Inventor: Takaichi Mabuchi, 5-2 Tokiwadaira 6-chome, Matsudo-shi, Chiba-ken, Japan

[21] Appl. No.: 79,894

[22] Filed: Sep. 28, 1979

[30] Foreign Application Priority Data

| | | | |
|---|---|---|---|
| Oct. 9, 1978 | [JP] | Japan | 53-138780[U] |
| Dec. 29, 1978 | [JP] | Japan | 53-181767[U] |

[51] Int. Cl.$^3$ .............. H02K 13/00

[52] U.S. Cl. .............. 310/239; 310/242

[58] Field of Search .............. 310/239, 242, 244–247, 310/232, 248, 249

[56] References Cited

U.S. PATENT DOCUMENTS

| | | | |
|---|---|---|---|
| 4,085,343 | 4/1978 | Yoshida | 310/246 |
| 4,088,912 | 5/1978 | Yoshida | 310/244 |
| 4,157,483 | 6/1979 | Frimley | 310/242 |

*Primary Examiner*—R. Skudy

[57] ABSTRACT

A brush holding device of a rectangular shape, comprising a brush holding plate, made of a resilient material, having formed bent pieces on both side edges thereof, the brush holding plate having a brush insert hole on the edges of which lanced and raised pieces are provided. A brush is held in position by the aid of resiliency caused by the deformation of the bent pieces provided on both side edges of the brush holding plate when inserting the brush into the brush inserting hole.

11 Claims, 12 Drawing Figures

BRUSH HOLDING DEVICE

BACKGROUND OF THE INVENTION

1. Field of the Invention

This invention relates generally to a brush holding device, and more particularly to a brush holding device for holding a brush for making electrical contact with a commutator of a small electric motor.

2. Description of the Prior Art

In a small electric motor, brushes for making electrical contact with commutators are resiliently supported by brush holding plates made of a resilient, electrically conductive material and electrically connected to the brush holding plates. In this type of brush holding device having a brush holding plate, which is constructed so as to hold the top of a brush in position by the resiliency of lanced and raised pieces, damages are often caused to the top of the brush. That is, lanced and raised pieces of an L-shaped cross section are provided as a means for holding a brush on a brush holding plate by lancing and raising a part of the brush holding plate made of an electrically conductive, resilient material, and the brush is held in position between the edges of the lanced and raised pieces by forcing the brush in between the lanced and raised pieces. This construction often causes the edges of the lanced and raised pieces to cut into the engaging surfaces of the brush which is usually of brittle nature, resulting in damages to the top of the brush. On the other hand, to reduce the contact pressure of the brush to the commutators, the recent trend is toward the use of thinner materials for the brush holding plate, and consequently toward the increased width of the brush holding plate to increase the mechanical strength of the brush holding plate itself. However, an excessive increase in the width of the brush holding plate relative to the width of the brush proper is not desirable in terms of limited space inside the motor. It is necessary, therefore, to devise an effective means for holding a brush on a brush holding plate while maintaining the mechanical strength of the brush holding plate itself.

SUMMARY OF THE INVENTION

It is an object of the present invention to provide a brush holding device which overcomes the aforementioned problems.

It is another object of the present invention to provide a brush holding device which overcomes the abovementioned problems by providing bent pieces on both side edges of a brush holding plate, and providing lanced and raised pieces having an L-shaped cross section on the edges of a brush inserting hole on the brush holding plate.

It is another object of the present invention to provide a brush holding device wherein lanced and raised pieces having an L-shaped cross section are provided in the longitudinal and transverse directions of a brush holding plate.

It is another object of the present invention to provide a brush holding device wherein notched grooves are provided on both sides of the lanced and raised pieces so as to give a free movement to the lanced and raised pieces and to permit the brush holding pressure to be adjusted.

These and other objects of the present invention will become more apparent by referring to the following description and the accompanying drawings.

DETAILED DESCRIPTION OF THE EMBODIMENT

Figure 1:
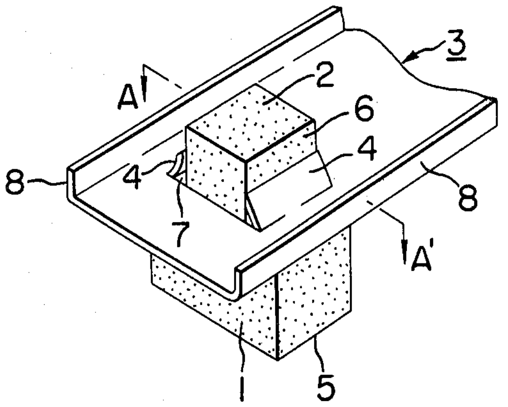
FIG. 1 PRIOR ART
FIG. 1 is a perspective fragmentary view of one example of a prior art brush holding device, illustrating the state in which a brush is mounted on the brush holding plate thereof.
Figure 2:
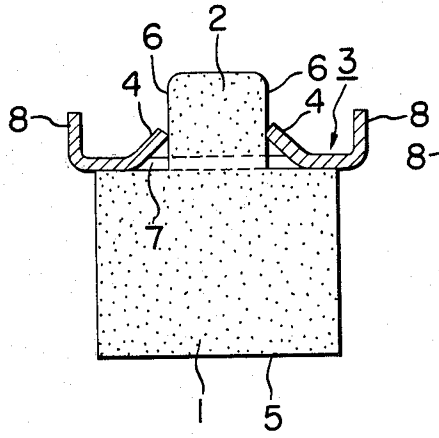
FIG. 2 PRIOR ART
FIG. 2 is a cross-sectional elevational view of the brush holding device of FIG. 1 taken along the line A-A′ in FIG. 1.
Figure 3:
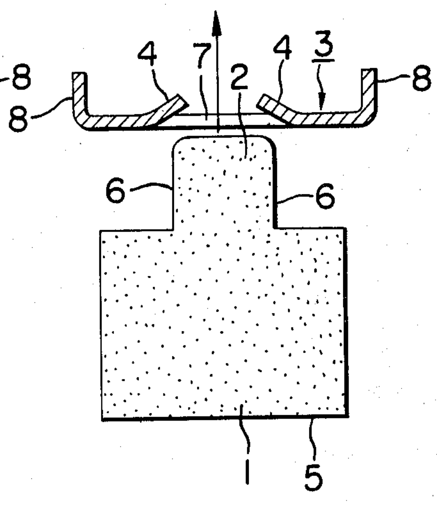
FIG. 3 PRIOR ART
FIG. 3 is a cross-sectional exploded, elevational view illustrating the process in which a brush is mounted on the brush holding plate.

In FIGS. 1 through 3 showing one example of the brush holding device of the prior art reference numeral 1 refers to a brush, for example, a carbon brush; 2 to the top portion of the brush 1; 3 to a brush holding plate; 4 and 4 to lanced and raised pieces formed by lancing and raising the edges of a brush inserting hole 7; 5 to the end face of the brush 1 for making electrical contact with a commutator portion of a motor (not shown); 6 and 6 to the engaging surfaces of the brush 1 for engaging with the lanced and raised pieces 4 and 4, respectively; 7 to a brush inserting hole through which the brush top 2 is inserted; 8 and 8 to sidewalls for reinforcing the brush holding plate 3, respectively. In mounting the brush 1 on the brush holding plate 3, the brush 1 and the brush holding plate 3 are disposed as shown in FIG. 3 and the brush 1 is forced into the brush holding plate 3 in the direction shown by an arrow in the figure. The brush top 2 is forced in between the lanced and raised pieces 4 and 4 and inserted into the brush inserting hole 7 while resisting the resiliency of the lanced and raised pieces 4 and 4 wich acts as a force to restore the pieces 4 and 4 to the original position. Thus, the brush 1 is mounted on the brush holding plate 3, as shown in FIGS. 1 and 2. After this brush mounting process, the brush 1 is resiliently supported by receiving the resiliency of the lanced and raised pieces 4 and 4 on the brush engaging surfaces 6 and 6. However, in this type of brush holding device having such a construction that the brush top is held in position by the resiliency of the lanced and raised pieces 4 and 4, damages are often caused to the brush top.

Taking into consideration the drawback of the brush holding devices in which a brush of brittle nature is held in position by the resiliency of the edges of lanced and raised pieces, the brush holding device of this invention is constructed in such a manner that lanced and raised pieces are caused to be freely moved and the resiliency caused by the elastic deformation of the bent pieces provided on both side edges of a brush holding plate is positively utilized for securing a brush in position. An embodiment of this invention will be described in the following, referring to FIGS. 4 through 7.

In FIGS. 4 through 7, reference numeral 3′ refers to a brush holding plate made of an electrically conductive, resilient material; 4′ and 4′ to lanced and raised pieces having an L-shaped cross section; 9 and 9 to the corners of the lanced and raised pieces 4′ and 4′; 10 and 10 to notched grooves formed on both sides of the lanced and raised pieces 4′ and 4′; 11 and 11 to the obtuse bent portions or second sections of the lanced and raised pieces 4′ and 4′; 12 and 12 to the base portion or first section of the lanced and raised pieces 4′ and 4′; 13 and 13 to the elastically deformed portions of the sidewalls 8 and 8. Other numerals correspond with like numerals in FIG. 1 through 3.

Figure 4:
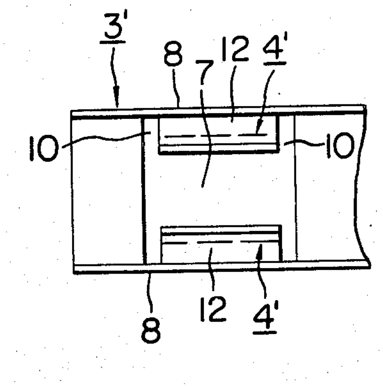
FIG. 4 is a plan fragmentary view of a brush holding plate embodying this invention.
Figure 5:
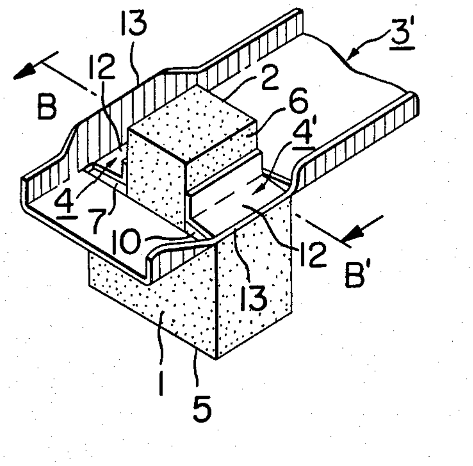
FIG. 5 is a perspective fragmentary view illustrating the state in which a brush is mounted on the brush holding plate shown in FIG. 4.
Figure 6:
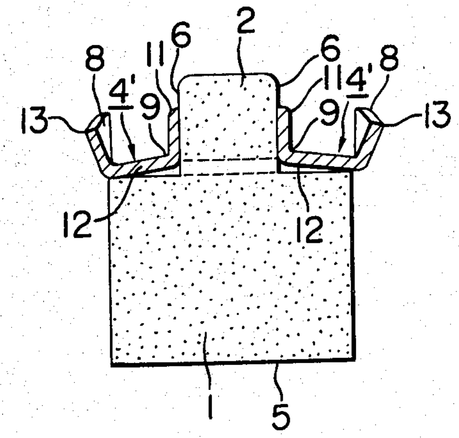
FIG. 6 is a cross-sectional elevational view taken along the line B-B′ shown in FIG. 5.
Figure 7:
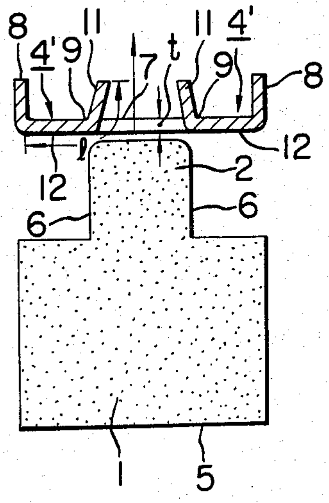
FIG. 7 is a cross-sectional exploded, elevational view illustrating the process in which a brush is mounted on a brush holding plate.
Figure 8:
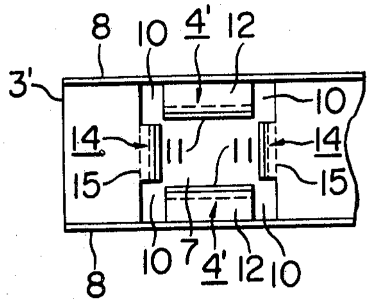
FIG. 8 is a plan fragmentary view of another embodiment of the brush holding device according to this invention.
Figure 9:
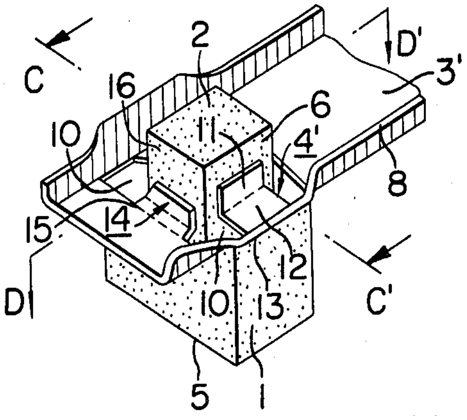
FIG. 9 is a perspective fragmentary view illustrating the state in which a brush is mounted on the brush holding plate shown in FIG. 8.
Figure 10:
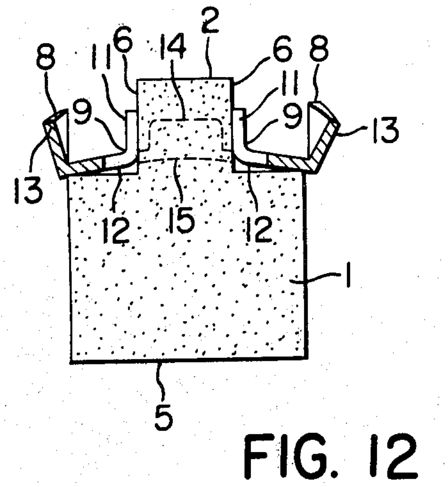
FIG. 10 is a cross-sectional elevational view taken along the line C-C′ shown in FIG. 9.
Figure 11:
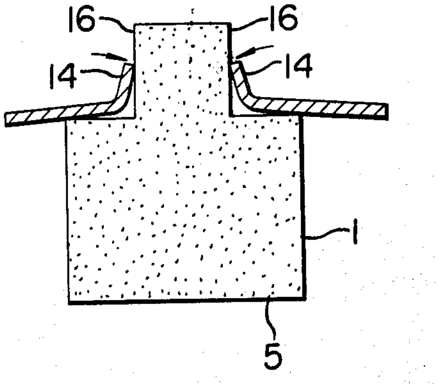
FIG. 11 is a cross-sectional elevational view taken along the line D-D′ shown in FIG. 9.
Figure 12:
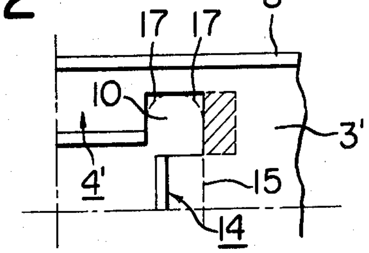
FIG. 12 is a partial enlarged planed view illustrating another example of the notched grooves.

In recent years, there is an increasing tendency to reduce the thickness of the brush holding plate 3′ to reduce the contact pressure of the brush 1 to the commutators and accordingly to increase the width of the brush holding plate 3′ to increase the mechanical strength of the brush holding plate 3′. It is not desirable in terms of the limited space inside the motor, however, to excessively increase the width of the brush holding plate 3′ relative to the width of the brush 1. To overcome this problem, sidewalls 8 and 8 are usually formed on both side edges of the brush holding plate 3′ (3 in FIGS. 1 through 3), as shown in FIGS. 1 through 3. In this construction, the bent pieces 8 and 8 of a length covering a range required for holding the brush 1 are sufficient for the purpose, and it is not necessarily desirable to provide the sidewalls 8 and 8 over the entire length (not shown) of the brush holding plate 3′ (3). That is, the longitudnal length of the sidewalls 8 and 8 provided on the brush holding plate 3′ (3) is determined taking into consideration its effect on the contact pressure of the brush 1 to the commutators. The length l (shown in FIG. 7) of the bent portions 11 and 11 and the base portions 12 and 12, both comprising the lanced and raised pieces 4′ and 4′, is in the order of a few times the thickness t of the brush holding plate 3′ (in other words, the thickness t of the lanced and raised pieces 4′ and 4′). For this reason, the use of the resiliency of the lanced and raised pieces themselves for holding the brush 1 in position may cause damages to the top portion 2 of the brush 1. As can be seen in FIGS. 4 and 5, therefore, this invention has such a construction that notched grooves 10 and 10 are provided on both sides of the lanced and raised pieces 4′ and 4′ so as to permit the lanced and raised pieces 4′ and 4′ to be resiliently bent more freely, that is, to facilitate the elastic deformation of the sidewalls 8 and 8 provided on both sides of the brush holding plate 3′. When mounting the brush 1 to the brush holding plate 3′, the brush holding plate 3′ and the brush 1 are disposed as shown in FIG. 7 and the brush 1 is forced onto the brush holding plate 3′ in the direction shown by an arrow in the figure. This causes the brush top 2 to expand the base portions 12 and 12 of the lanced and raised pieces 4′ and 4′ and to enter into the brush inserting hole 7 while inducing the elastic deformation of the sidewalls 8 and 8. In this process, the brush 1 is inserted in the brush inserting hole 7 while the engaging surfaces 6 and 6 of the brush 1 and the bent portions 11 and 11 of the lanced and raised pieces 4′ and 4′ are kept essentially in contact with each other. And, the brush holding plate 3′ on which the brush 1 is mounted assumes a shape shown in FIGS. 5 and 6, the sidewalls 8 and 8 being subjected to elastic deformation and expanding outward as the brush 1 enters into the brush inserting hole 7. Thus, the brush 1 is held in position by resiliency of the sidewalls 8 and 8. Furthermore, in order to facilitate the elastic deformation of the sidewalls 8 and 8, notched grooves 10 and 10 are provided in such a manner that the grooves 10 and 10 extend to the foot portions of the sidewalls 8 and 8, as shown in FIGS. 4 and 5. The depth of the notched groove 10 is of course determined by (i) the thickness t of the brush holding plate 3′ itself, (ii) the height of the sidewalls 8 and 8, etc. so as to set the magnitude of the resilience caused by the deformation of the sidewalls 8 and 8 at a desired value. That is, the depth of the notched groove 10 may not be deep enough to extend to the foot portions of the sidewalls 8 and 8 in some cases, or must be as deep as it encroaches on the feet of the sidewalls 8 and 8 in other cased, depending on the aforementioned conditions (i) and (ii). Even in the embodiment shown in FIGS. 4 and 5, however, the elastic deformation of the sidewalls 8 and 8 of course acts as a force to hold the brush 1.

In the state described with reference to FIGS. 4 through 7, a brush holding device in which, for example, a flat brush holding plate is provided without forming the sidewalls 8 and 8. In this case, however, the lanced and raised pieces 4′ and 4′ are elastically moved with respect to the brush holding plate 3′ at the notched portions of the notched grooves 10 and 10, making use of the resiliency of the brush holding plate 3′. In this case, if the elastic force caused by the elastic deformation of the brush holding plate 3′ itself is to be reduced to such a degree that no damage is caused to the brush top 2, the notched grooves 10 and 10 have to be cut considerably deep. This would inevitably reduce the mechanical strength of the brush holding plate 3′. On the contrary, increasing the width of the brush holding plate 3′ to increase the mechanical strength of the brush holding plate 3′ would unwantedly increase the aforementioned elastic force. In this invention, therefore, the sidewalls 8 and 8 are adapted to be elastically deformed, independently of the flat portion of the brush holding plate 3′, making the adjustment of the elastic force easy.

In the abovementioned embodiments, a construction that the lanced and raised pieces 4′ and 4′ having an L-shaped cross section and facing with each other are provided along the longitudinal direction of the brush holding plate 3′ has been described. Now, description will be made on another embodiment in which, in addition to first lanced and raised pieces having an L-shaped cross section provided along the longitudinal direction of the brush holding plate 3′, as in the aforementioned embodiment, second lanced and raised pieces having an L-shaped cross section are provided along the across-the-width direction of the brush holding plate 3′, referring to FIGS. 8 through 12.

In FIGS. 8 through 12, reference numerals 14 and 14 refer to second lanced and raised pieces provided along the across-the-width direction of the brush holding plate 3′; 15 and 15 to the base lines of the second lanced and raised pieces or two additions bent pieces 14 and 14; 16 and 16 to the engaging surfaces of the brush top 2 for making contact with the second lanced and raised pieces 14 and 14; 17 and 17 to the corner portions of the notched grooves 10 and 10, respectively. Other numerals correspond with like numerals in FIGS. 4 and 7.

In this embodiment, when mounting the brush 1 on the brush holding plate 3′, the brush top 2 is forced in between the base portions 12 and 12 of the first lanced and raised pieces 4′ and 4′ and the second lanced and raised pieces 14 and 14. And, as the brush 1 is inserted into the brush inserting hole 7, the engaging surfaces 6 and 6 of the brush 1 and the corner portions 9 and 9 of the first lanced and raised pieces 4′ and 4′ come almost in contact with each other, and thus, the base portions 12 and 12 are slightly raised at an angle with respect to the flat surface of the brush holding plate 3′. In this case, the brush holding plate 3′ on which the brush is mounted is subjected to elastic deformation in such a manner that the sidewalls 8 and 8 expand outward as the brush 1 enters into the brush inserting hole 7, and consequently secures the brush 1 in position via the first lanced and raised pieces 4′ and 4′ by the resiliency to restore the sidewalls 8 and 8 to the original position. As in the embodiment shown in FIGS. 4 through 7, the notched grooves 10 and 10 are provided to facilitate the elastic deformation of the sidewalls 8 and 8. The shape of the notched grooves 10 and 10 is not limited to a rectangular shape, but the corner portions 17 and 17 may be rounded to permit the elastic force of the lanced and raised pieces to be adjusted to a desired value. In addition, the notched groove 10 and 10 may be cut out, exceeding the base line 15 of the second lanced and raised piece 14 by removing the shaded portion shown in FIG. 12.

On the other hand, the base lines 15 and 15 of the second lanced and raised pieces 14 and 14 disposed in the transverse direction of the brush holding plate 3′ are subjected to deflection, due to the outward expanding elastic deformation of the sidewalls 8 and 8 in such a manner that the central portion of the base line 15 is raised upward. This state is shown by dotted lines in FIG. 10. As a result, the second lanced and raised pieces 14 and 14 receive a force in the direction to push the sides of the brush 1, the top sides of the second lanced and raised pieces 14 and 14 being pushed against the engaging surfaces 16 and 16 of the brush top 2, thus preventing the longitudinal and transverse movement of the brush 1.

As described above, this invention makes it possible to provide a brush holding device which secures a brush in position without causing damages to the brush top because bent pieces are provided on both side edges of a brush holding plate along the longitudinal direction of the brush holding plate, and because lanced and raised pieces are adapted to be freely movable with respect to the bent pieces.

Furthermore, this invention makes it possible to provide a brush holding plate which is free of longitudinal and transverse movement in resiliently securing the brush and capable of adjusting the elastic force because lanced and raised pieces are provided in the longitudinal and width direction of the brush holding plate, and because notched grooves are provided on both sides of the lanced and raised pieces.

What is claimed is:

1. A brush holding device for a brush of an electric motor wherein the transverse cross-section of one end of the brush is formed into a rectangular, parallelepiped shape, the opposed ends of which are parallel to each other, said brush holding device comprising a rectangular, resilient plate including an opening therethrough, the shape of which corresponds to the cross-sectional shape of the end of the brush for receiving the one end of the brush, a pair of opposed, elastically deformable sidewalls integral with and extending along at least the portion of the length dimension of said plate that is adjacent the opening therethrough and at least two opposed bent pieces formed integrally with said plate, said bent pieces extending into the opening and in a direction towards each other, said bent pieces each comprising a first section integral with said plate and a second section extending from said first section, said second section having a surface area that is at an obtuse angle with respect to the plane of said first section, said surface area of each of said second sections being adapted to retainably contact one of the sides of the one end of the brush.

2. The brush holding device according to claim 1 wherein said bent pieces extend from the juncture of said sidewalls and the plane of said plate.

3. The brush holding device according to claim 1 wherein there is a groove formed between at least a portion of the opening that are transverse to the length dimension of said plate and the bent pieces.

4. The brush holding device according to claim 1 wherein the length of said first section of said bent piece, measured from the juncture of said first section and said respective sidewall to the juncture of said first section and said second section, is at least two times the thickness of said plate.

5. The brush holding device according to claim 1 wherein there are two additional bent pieces each having the same configuration as first mentioned two bent pieces, each of said two additional bent pieces extending from an edge of the opening that is perpendicular to the plane of said sidewalls, said two additional bent pieces extending into said opening and being directed towards each other.

6. The brush holding device according to claim 5 wherein the length of said first section of said two additional bent pieces, measured from the juncture of said first section thereof and the respective edge of the opening to the juncture of said first section and said second section, is at least two times the thickness of said plate.

7. The brush holding device according to claim 5 wherein the first mentioned two bent pieces extend from the juncture of said sidewalls and the plane of said plate.

8. The brush holding device according to claim 7 wherein the side edges of adjacent ones of the first two bent pieces and the two additional bent pieces each define a notched groove in said plate.

9. The brush holding device according to claim 8 wherein the notched grooves are square.

10. The brush holding device according to claim 8 wherein the notched grooves are circular.

11. The brush holding device according to claim 8 wherein the notched grooves are rectangular.

* * * * *